(12) United States Patent
Thomeczek

(10) Patent No.: US 8,201,867 B2
(45) Date of Patent: Jun. 19, 2012

(54) THREADED HOIST RING SCREW RETAINER

(75) Inventor: John Thomeczek, Alexandria, NH (US)

(73) Assignee: MJT Holdings LLC, Valdosta, GA (US)

( * ) Notice: Subject to any disclaimer, the term of this patent is extended or adjusted under 35 U.S.C. 154(b) by 218 days.

(21) Appl. No.: 12/416,892

(22) Filed: Apr. 1, 2009

(65) Prior Publication Data
US 2010/0207406 A1     Aug. 19, 2010

Related U.S. Application Data

(60) Provisional application No. 61/152,935, filed on Feb. 16, 2009.

(51) Int. Cl.
*B66F 19/00* (2006.01)
(52) U.S. Cl. ............. 294/215; 294/89; 403/78; 403/164
(58) Field of Classification Search .................. 294/1.1, 294/82.1, 89; 403/79, 164, 119, 78; 411/400, 411/401
See application file for complete search history.

(56) References Cited

U.S. PATENT DOCUMENTS

| | | | | |
|---|---|---|---|---|
| 3,297,293 | A | * | 1/1967 | Andrews et al. ............... 248/499 |
| 4,641,986 | A | | 2/1987 | Tsui |
| 5,352,056 | A | | 10/1994 | Chandler |
| 5,405,210 | A | | 4/1995 | Tsui |
| 6,032,993 | A | * | 3/2000 | Kwon .............................. 294/1.1 |
| 6,068,310 | A | * | 5/2000 | Fuller et al. ...................... 294/1.1 |
| 6,349,985 | B1 | * | 2/2002 | Aston .............................. 294/1.1 |
| 6,443,514 | B1 | * | 9/2002 | Fuller et al. ...................... 294/1.1 |
| 6,953,212 | B2 | * | 10/2005 | Alba .............................. 294/1.1 |

* cited by examiner

*Primary Examiner* — Saul Rodriguez
*Assistant Examiner* — Stephen Vu
(74) *Attorney, Agent, or Firm* — Bruce A. Jagger; Lance M. Pritikin

(57) ABSTRACT

An omni-positional hoist ring assembly including a bushing element that includes a sleeve with an axial length, a proximal end and a distal end. A load bearing flange is radially disposed about the proximal end of the sleeve. The sleeve has an internal thread extending at least part way of the axial length of the sleeve. A mounting screw element has a major axis, a head, and a shank disposed generally co-axially around the major axis. The shank includes a threaded shank portion and a bearing portion. The bearing portion is a generally cylindrical axially extending portion of the shank that has a diameter approximately equal to the minor diameter of the thread in the threaded shank portion. A thrust washer element is provided between the head and the distal end of the sleeve. A body element receives the in-turned opposed ends of the legs of a lifting loop element in sockets. The lifting loop is free to pivot. The body element is free to rotate about the sleeve, so the lifting loop will self align with a load that is applied to it from any direction within a hemisphere centered on the major axis of the mounting screw element. The elements of the hoist rig assembly are assembled by aligning them and inserting the mounting screw element into the sleeve and threadably advancing it until the bearing is aligned with the internal thread so further rotation of the mounting screw element does not threadably advance the mounting screw element relative to the sleeve.

3 Claims, 3 Drawing Sheets

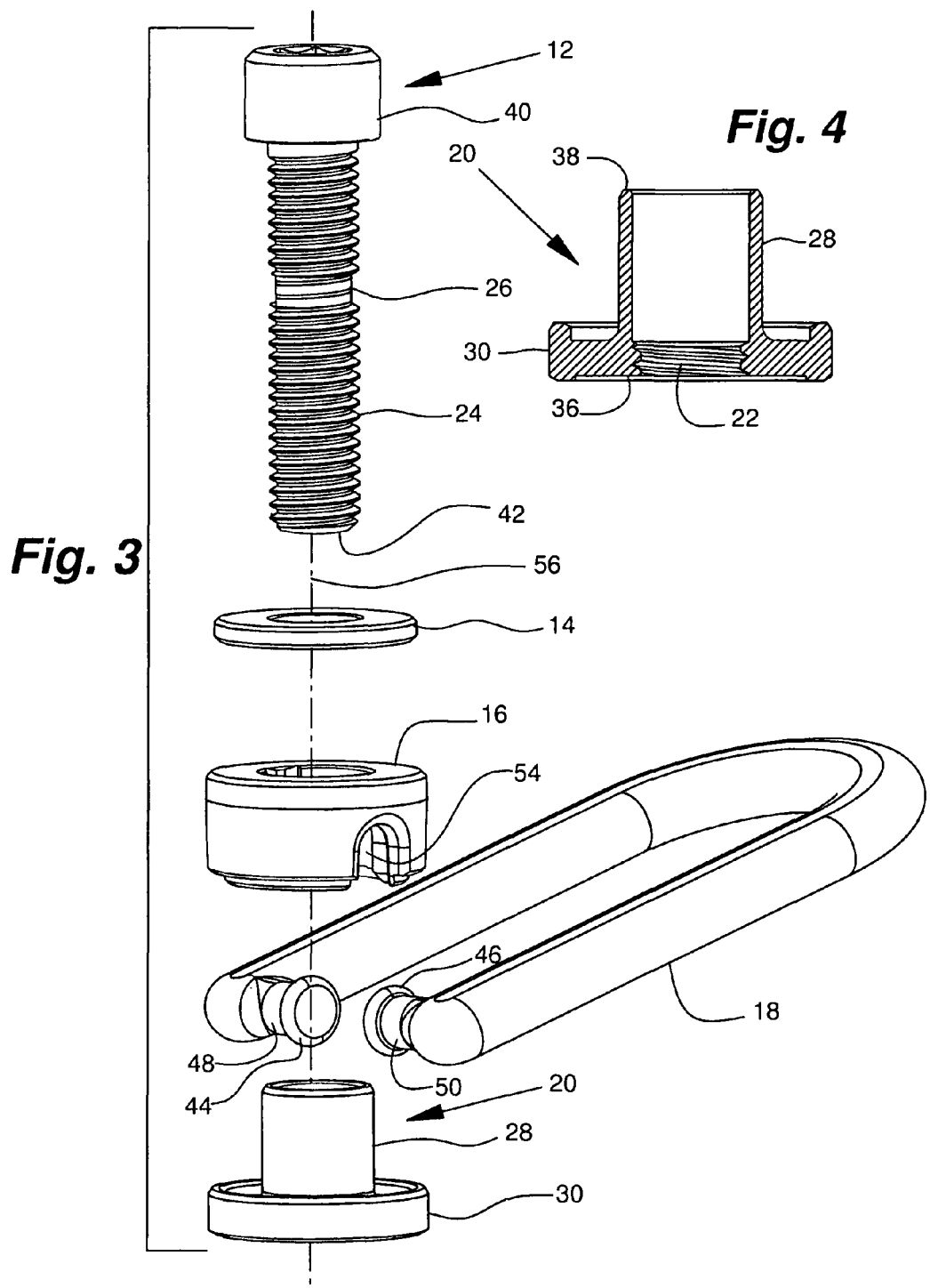

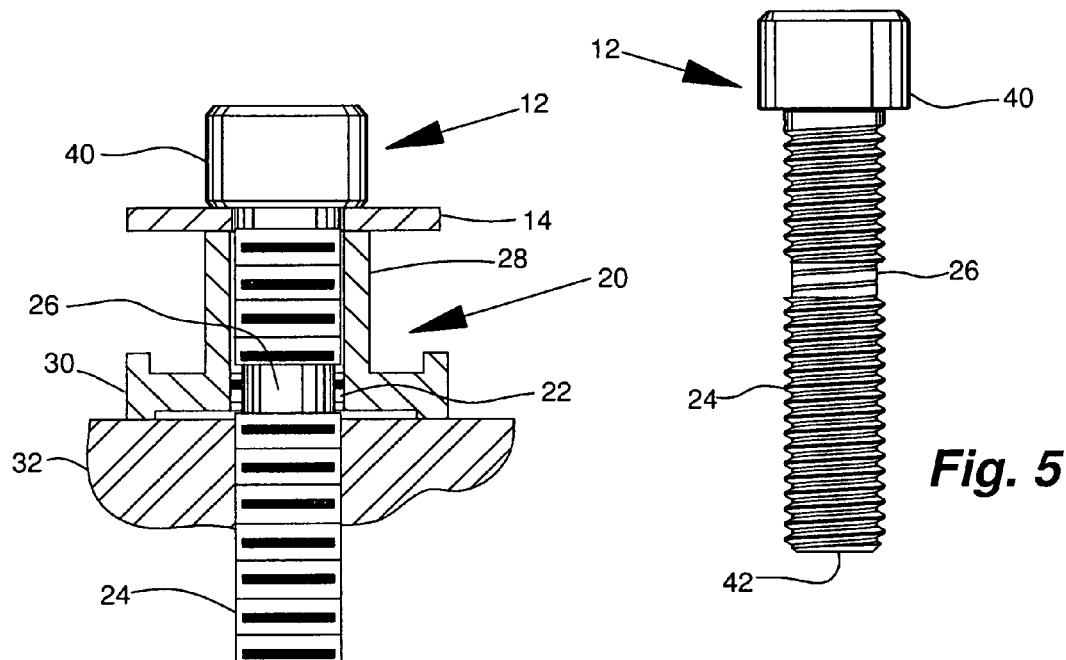
*Fig. 5*
*Fig. 6*
*Fig. 7*
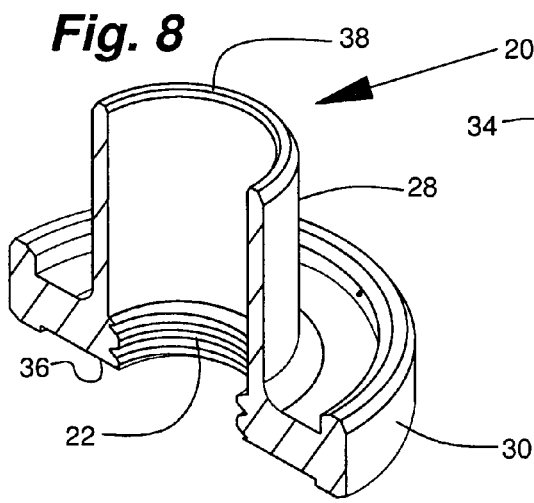
*Fig. 8*

THREADED HOIST RING SCREW RETAINER

RELATED APPLICATIONS

This application claims the benefit of U.S. Provisional Application No. 61/152,935, filed Feb. 16, 2009.

TECHNICAL FIELD OF THE INVENTION

The present invention relates generally to omni-positional hoist rings and particularly to hoist ring assemblies that are held in an assembled configuration.

BACKGROUND OF THE INVENTION

Previous hoist ring mounting screws had been held in an assembled configuration with a thrust washer element, a bushing element, a rotatable body element, and a pivotally mounted lifting loop element by way of a snap ring or a retaining ring on the hoist ring mounting screw. The use of a snap ring in an annular groove on the shank of a mounting screw is disclosed, for example, in Tsui U.S. Pat. No. 5,405,210, and in Tsui et al. U.S. Pat. No. 4,641,986, both of which are hereby incorporated herein by reference as though fully set forth hereat. The use of a retention ring is disclosed, for example, in Chandler U.S. Pat. No. 5,352,056, which is hereby incorporated herein by reference as though fully set forth hereat.

Hoist rings are critical safety devices. Safety is the paramount concern when designing hoist rings. Workers in this art proceed very cautiously with design changes, and adopt changes only when they are proven to be safe and effective.

It is of concern to workers in this art that the hoist rings they design are mounted by the end users to the loads they are intended to lift. Precautions must be taken in the design process to insure insofar as possible that it is easy, simple, and straightforward for an end user to properly mount hoist rings to such loads. One such precaution involves designing hoist rings so that they are provided to the end user in a fully assembled configuration with all of the elements joined together in one assembly. This eliminates the risk that some element will be left out or that the hoist ring will be improperly assembled. Another design consideration has been to minimize the number of separate elements in the hoist ring. If an element is not present in the design, it cannot fail or be improperly installed.

The prior snap rings have served to hold the elements of hoist rings in a fully assembled configuration, but the snap rings themselves are separate elements. This adds to the complexity of the assembly. Also, there has been some concern that during handling, installation, or use, the snap rings might become separated from the hoist ring assemblies. If, for example, a snap ring were to be dislodged during installation it might lodge between the hoist ring assembly and the load to which it is attached. This might prevent the hoist ring from being properly tightened to a load. The same concerns apply to retention rings.

Those in the art concerned with such problems, and particularly those concerned with safety have long recognized the need to reduce the number of elements and secure them together so that the elements of hoist rings cannot become accidentally separated from one another. There is a need to eliminate as many separate elements from hoist ring assemblies as possible.

SUMMARY OF THE INVENTION

According to the present invention, embodiments of a hoist ring assembly comprise a bushing element that includes a sleeve. The sleeve has proximal and distal ends and an axial length. The bushing element includes a flange extending generally radially of the sleeve adjacent the proximal end. The sleeve includes an internal thread. A mounting screw element has an axially extending shank that is adapted to be received axially in the bushing element. The shank includes a bearing portion and a threaded shank portion. The bearing portion is adapted to being adjacent the internal thread when the hoist ring assembly is in an assembled configuration. The threaded shank portion is adapted to threadably engage the internal thread when the hoist ring is being assembled and disassembled.

According to further embodiments, the internal thread extends axially for less than the axial length of the sleeve. In additional embodiments, the bearing portion extends for a greater axial length than the internal thread. In further embodiments, the internal thread extends axially for less than the axial length, and the internal thread is adjacent the proximal end. Certain embodiments include a body element rotatably mounted on the sleeve, and a lifting loop element pivotally mounted to the body element. The lifting loop element is omni-positional within approximately a hemisphere centered on a major axis of the mounting screw element.

The detailed description of embodiments is intended to serve merely as examples, and is in no way intended to limit the scope of the appended claims to these described embodiments. Accordingly, modifications to the embodiments described are possible, and it should be clearly understood that the invention may be practiced in many different ways than the embodiments specifically described below, and still remain within the scope of the claims.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 3 depicts an exploded view of an embodiment.

FIG. 4 depicts a cross-sectional view of an internally threaded bushing according to an embodiment.

FIG. 5 depicts an elevational view of a bushing mounting screw according to an embodiment.

FIG. 6 depicts a hoist ring mounting screw threadably attached to a load and engaged with washer-bushing assembly shown in cross-section, but, for purposes of clarity of illustration f the embodiment, the body and lifting loop have been omitted.

FIG. 7 depicts an elevational view of an embodiment of a hoist ring mounting screw having an extended bearing section.

FIG. 8 depicts a cross-sectional perspective view of a bushing embodiment.

Figure 1:
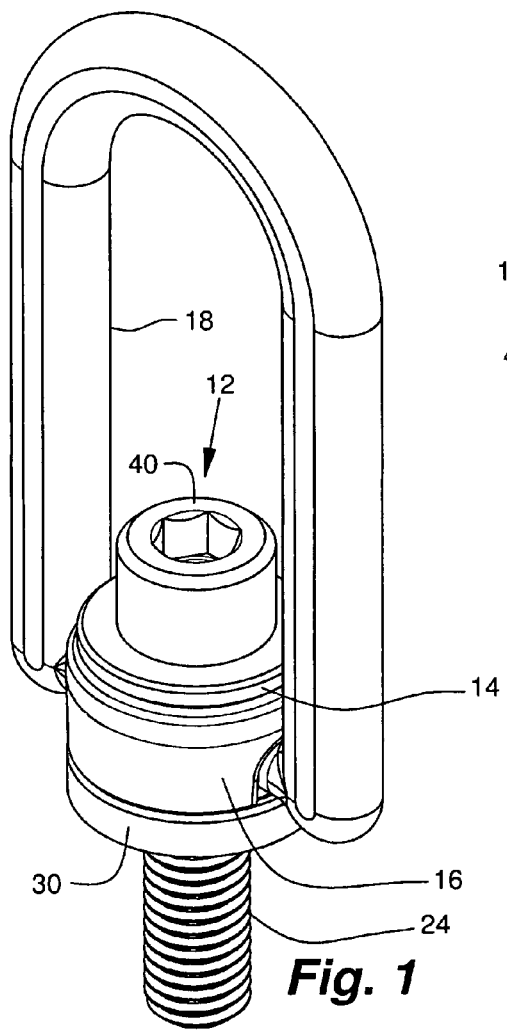
FIG. 1 depicts a perspective view of an embodiment of a hoist ring.
Figure 2:
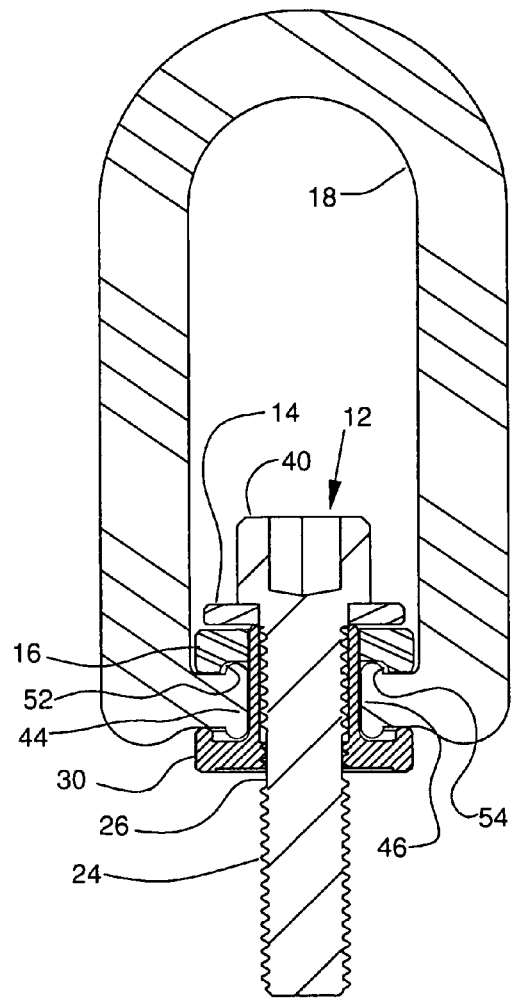
FIG. 2 depicts a cross-sectional view of the embodiment of FIG. 1.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications.

DETAILED DESCRIPTION OF THE INVENTION

The following description of preferred embodiments generally relates to omni-positional hoist ring assembles.

Referring particularly to the accompanying drawings, in the embodiment chosen for illustration, a hoist ring assembly includes a lifting loop element 18 that is captured for pivotal movement within a body element 16. Body element 16 is rotatably captured between a thrust washer element 14 and a bushing element that is indicated generally at 20. Thrust washer element 14 and bushing element 20 are adapted to be mounted to a load 32 by a mounting screw element that is indicated generally at 12, and which extends axially through them and into load 32.

In the embodiment chosen for purposes of illustration, bushing element 20 includes a sleeve 28 and a flange 30. Sleeve 28 is a generally right cylinder having proximal end 36 and distal end 38 axially opposed to one another. Sleeve 28 includes an internal thread 22 extending for at least a portion of the internal axially length of sleeve 28. Internal thread 22 is adapted to threadably engage a threaded shank portion 24 of mounting screw element 12. Flange 30 extends generally radially of sleeve 28 adjacent proximal end 36. Flange 30 is adapted to bear against a surface of load 32 to which the hoist ring assembly is mounted.

In the embodiment chosen for purposes of illustration, mounting screw element 12 has a head 40 at one end, an opposed end 42, a major axis 56 extending between head 40 and opposed end 42, and a shank extending generally coaxially and symmetrically around major axis 56. At least a portion of the shank that is opposed to the head is threaded. Threaded shank portion 24 is adapted to threadably engage internal thread 22 of bushing element 20. A threadless axially extending portion of the shank serves as bearing portion 26. Bearing portion 26 is defined by a generally axially extending generally cylindrical surface with a diameter approximately equal to the minor diameter of the thread of threaded shank portion 24. Bearing portion 26 is adapted to be laterally aligned with internal thread 22 of bushing element 12 when the hoist ring is fully assembled (as shown, for example, in FIG. 6). The absence of threads in bearing portion 26 allows screw element 12 to turn freely without threadably advancing relative to bushing element 20 when bearing portion 26 is aligned with internal thread 22.

In the embodiment chosen for purposes of illustration, body element 16 receives the opposed ends 44 and 46 of the in-turned legs 48 and 50, respectively, of lifting loop element 18 in opposed sockets 52 and 54, respectively. Opposed ends 44 and 46 of the in-turned legs 48 and 50, respectively, fit loosely in opposed sockets 52 and 54, respectively, so that they are free to pivot in their respective sockets. The sockets are closed by flange 30 so that opposed ends 44 and 46 of the in-turned legs cannot escape when the body element 16 is mounted on sleeve 28 of bushing element 20.

Body element 16 is trapped between thrust washer element 14 at distal end 38 of bushing element 20, and flange 30 at proximal end 36 of sleeve 28. The axially length of sleeve 28 between flange 30 and distal end 38 is greater than the axial thickness of body element 16, so body element 16 is free to rotate around the sleeve.

Body element 16 carries lifting loop element 18 with it as it rotates about sleeve 28 of bushing element 20. Lifting loop element 18 is thus free to pivot and swivel through approximately a hemispherical region centered about on the major axis of mounting screw element 12 to exactly align itself with the direction of a load that is applied to it.

To assemble a hoist ring, the elements are arranged as shown, for example, in FIG. 3, and mounting screw element 12 is inserted axially into thrust washer element 14, body element 16, and into bushing element 12 where it encounters internal thread 22. Mounting screw element 12 is then threadably advanced into bushing element 20 until bearing portion 26 is brought into alignment with internal thread 22. Mounting screw element 12 then rotates freely without threadable interaction with internal thread 22. Mounting screw element 12 must be unthreaded from the assembly to separate the elements. The portion of the shank between head 40 of mounting screw element 12 and threaded shank portion 24 in certain embodiments may include an extended bearing portion 34 (FIG. 7) that is devoid of threads, or in other embodiments it may be thread bearing (FIG. 6) on both sides of the bearing portion.

Deforming internal threads 22 slightly can prevent accidental unthreading of mounting screw element 12. Deformatio is accomplished, for example, by tapping the opposed end 42 of mounting screw element 12 after the hoist ring is assembled to the threaded shank. This drives the threads of threaded shank portion 24 axially and without rotation into internal thread 22. This deforms internal thread 22 and the thread of threaded shank portion 24 that is adjacent bearing portion 26 so that they will not easily threadably engage.

A hoist ring assembly is mounted to a load 32 by threadably inserting mounting screw element 12 into a mating threaded hole in load 32. Mounting screw element 12 is pre-stressed to a predetermined level by tightening it down against load 32 to a predetermined level of torque. The underside of head 40 bears against thrust washer 14 and thrust washer 14 bears against distal end 38 of sleeve 28 of bushing element 20. The force that mounting screw element 12 applies is transmitted through thrust washer 14 to sleeve 28 and into flange 30. This causes flange 30 around proximal end 36 of sleeve 28 (FIG. 6) to bear against the surface of load 32 around mounting screw element 12.

Internal thread 22 generally has an axial extent that is less than the axial extent of bearing portion 26. Internal thread 22 need not, and in certain embodiments does not extend for the full internal axial length of sleeve 28. Generally, there is no significant load applied to internal thread 22. An axial internal thread length of one-quarter or even one-eight or less of the axial length of sleeve 28 is generally sufficient, although longer lengths may be used according to certain embodiments, if desired. According to certain embodiments, when internal thread 22 has an axial length that is less than the axial length of sleeve 28, internal thread 22 can be positioned anywhere along the axial length of the sleeve. According to certain embodiments the internal thread is located adjacent the proximal end of the sleeve. The bearing portion needs to be positioned on the shank of the mounting screw element so that it mates with the internal thread, as described herein, when the hoist ring is in the fully assembled configuration.

The foregoing detailed description of the invention is intended to be illustrative and not intended to limit the scope of the invention. Changes and modifications are possible with respect to the foregoing description, and it is understood that the invention may be practiced otherwise than that specifically described herein and still be within the scope of the claims.

What is claimed is:

1. A hoist ring comprising:
   a bushing element including a sleeve, said sleeve having proximal and distal ends and an axial length, said sleeve including an internal thread;
   a mounting screw element having an axially extending shank, said axially extending shank adapted to be received axially in said sleeve, said shank including a bearing portion and a threaded shank portion, said bearing portion adapted to being laterally aligned with said internal thread when said hoist ring is in an assembled configuration, and said threaded shank portion being adapted to threadably engage said internal thread when said hoist ring is being assembled and disassembled;

a body element rotatably mounted on said sleeve, and a lifting loop element pivotally mounted to said body element, wherein said lifting loop element is pivotable and swivelable through approximately a hemispherical region centered on a major axis of said mounting screw element; and wherein said bearing portion extends for a greater axial length than said internal thread.

2. A hoist ring of claim 1 wherein said internal thread extends axially for less than said axial length.

3. A hoist ring of claim 1 wherein said internal thread extends axially for less than said axial length, and said internal thread is adjacent said proximal end.

* * * * *